March 7, 1967  S. B. BOSTER  3,307,602
THIN WALLED CONTAINER AND CLOSURE THEREFOR
Filed May 13, 1964
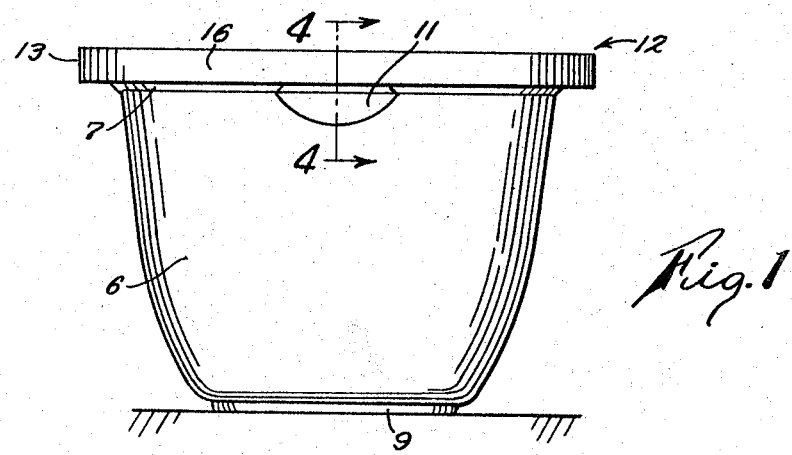
Fig.1
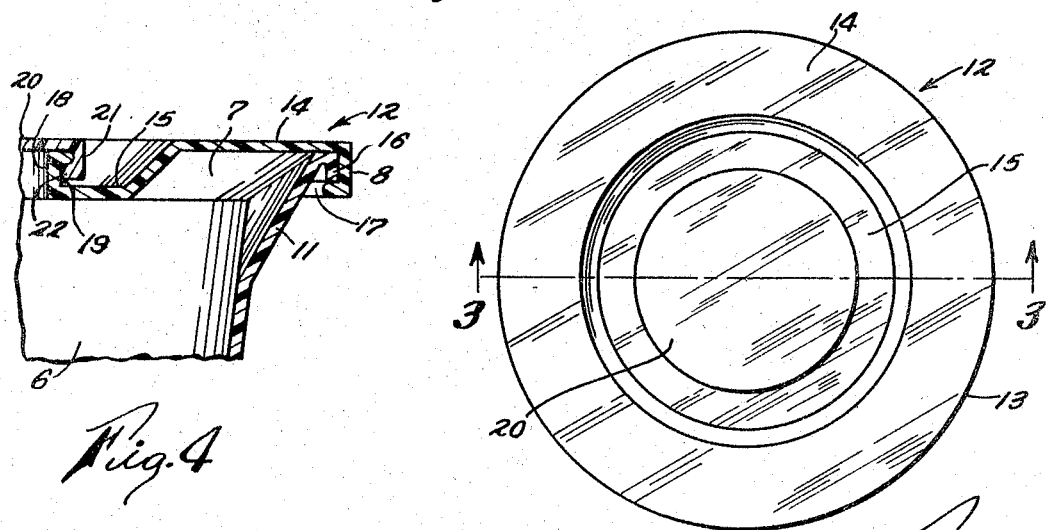
Fig.4
Fig.2
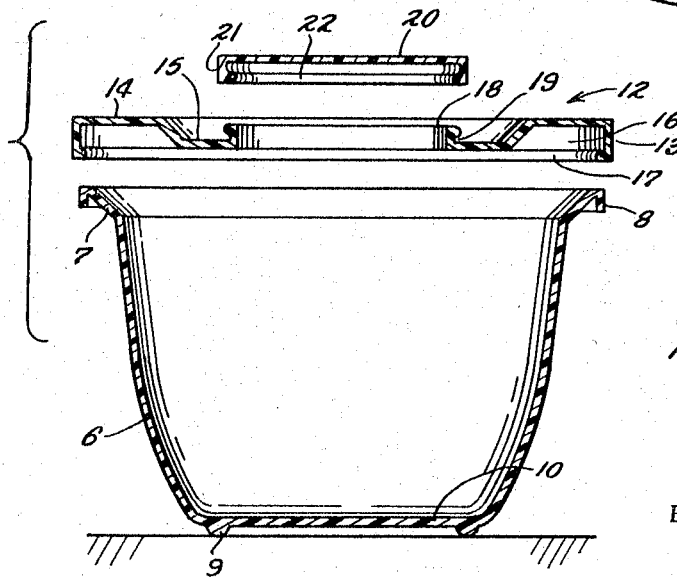
Fig.3
INVENTOR.
Samuel B. Boster
BY
Walter S. Murray
ATTY.

United States Patent Office 3,307,602
Patented Mar. 7, 1967

3,307,602
THIN WALLED CONTAINER AND CLOSURE
THEREFOR
Samuel B. Boster, 7233 Bookcrest Drive,
Cincinnati, Ohio 45222
Filed May 13, 1964, Ser. No. 367,034
1 Claim. (Cl. 150—.5)

The present invention relates to a reuseable food container and is particularly directed to a novel container and cooperative closure means that will provide a rugged and inexpensive package for the transportation, storage and dispensing of semisolid foodstuffs and when empty can be reused in the kitchen for the preparation of other foods.

A principal object of the invention is to provide a container and novel two-part, detachable closure means therefor, that will provide for the storing in a sealed condition of foodstuffs, such as vegetable shortening, or the like, for small quantity dispensations and which can also be reused as a bowl with an attached splash guard for the mixing and preparation of other foods with the aid of a kitchen mixer or beater.

Another object of the invention is to provide a detachable connection for a thin walled closure and a thin walled bowl that are each made of flexible plastic material and to further provide bowl and closure structures that cooperate to secure a good detachable closure connection between them.

With these and other objects in view my invention consists of the combination of parts set forth in the following specification and shown in the accompanying drawings, wherein:

FIG. 1 is a side elevational view of my thin walled container and closure means.

FIG. 2 is a top plan view of the container and closure means shown in FIG. 1.

FIG. 3 is a section taken on line 3—3 of FIG. 2, the parts being shown in exploded condition.

FIG. 4 is a fragmental, enlarged section taken on line 4—4 of FIG. 1.

With particular reference to the drawings wherein like reference numerals indicate similar parts throughout the several views the numeral 6 indicates a thin walled, bowl-shaped container that is made of a flexible plastic material such as linear polyethylene or polypropylene. The upper portion of the container is provided with an outwardly and upwardly flaring continuous rim 7 which terminates at its upper end in a tubular flange or skirt 8 that projects downwardly from the marginal edge of the rim 7. The rim 7 and the skirt 8 have the same wall thickness and are one-piece with the thin wall of the bowl-shaped container 6. An annular rib 9 is formed concentrically on the exterior surface of the bottom wall 10 of the container and, as will appear hereinafter, this annular rib forms a means for readily aligning and positioning the container upon like containers for stacking, transportation, and other purposes. The upper portion of the container wall and the rim may have an elongated portion 11 formed thereon to provide a pouring spout when the initial semi-solid contents of the container are depleted and the bowl-shaped container reused for holding and dispensing fluid contents or other kitchen requirements.

The container is provided with a two-part closure means that is generally indicated in the drawing by the reference numeral 12, said closure means having a thin walled, annular first part 13 comprising an outer planar portion 14 and a dished central portion 15. The entire first closure part has a uniform wall thickness that is made of linear polyethylene or polypropylene and is somewhat flexible throughout its extent. A tubular flange or skirt 16 extends downwardly at right angles from the margin of the planar portion 14 of the first closure part and in normal closed position embraces the tubular skirt 8 on the container. A continuous inturned lip 17 is formed on the lower inner edge of the skirt 16 and is normally adapted to have a snap-on, lapping engagement with the lower end edge of the tubular skirt 8 (FIG. 4). An upstanding annular neck 18 is formed integral on the inner edge of the dished portion 15 of the first closure part, said neck extending upwardly to a height that terminates within the plane of the planar portion 14. An outwardly facing, continuous groove 19 is formed on the exterior surface of the neck 18 to provide a cooperative, detachable connection between a second closure part which has the general form of a disk 20.

The second closure part 20 has a downturned marginal flange 21 that is normally adapted to embrace the neck 18 on the first closure part, said flange 21 having an inturned, continuous bead 22 formed around the inner lower edge thereof that will normally have a snap-on engagement with the groove 19 in the neck 18.

A thin walled container and closure having the cooperative structural elements and parts described hereinbefore is particularly useful as a shipping and storage receptacle for foodstuffs such as vegetable fats, or the like. Such foodstuffs may be readily packaged at the plant in the wide mouthed bowl of the container and the two-part, assembled closure may be attached to the bowl part by merely utilizing the snap-on connection between the skirt 16 of the closure and the flange 8 of the bowl, the continuous lip 17 between the flexible skirt and flange forming a strong, air tight sealed connection between the bowl and closure. In case the closed containers are to be stacked for transportation, store display or in a refrigerator, or the like, the closed containers are placed one upon the other, their alignment and stability in the stack being assured by engagement of the annular ring 9 on the bottom wall 8 of the uppermost container with the periphery of the second closure part 20 on the lowermost container in the stack.

After purchase of the foodstuff in the container by a housewife, the container can be readily reopened and reclosed many times for dispensation of its contents by manually operating the skirt and flange connection between the closure and bowl. Opening and reopening of the container is readily accomplished by placing the fingers of one hand beneath a limited portion of the continuous lip 17 on the closure skirt 16 and lifting up and away from the container. This action distorts the skirt and flange connection around the bowl and closure permitting the lip on the lifted part to disengage the skirt and edge and allowing sliding, disengagement of the entire lip from the skirt to remove the closure from the container. Straight downward pressure on the closure against the container will reclose the container. When the contents of the container have been depleted, the container can be reused over and over again as a mixing bowl in conjunction with manual or motor powered food mixers or beaters. To this end the bowl may be used with the two-part closure removed or when very fluid materials are to be mixed the second closure part 20 may be removed from the first closure part 13 and said closure part secured to the bowl by the skirt and flange connection. The mixer or beater element may then be inserted through the neck 18 of the first closure part whereby said part will act as a splash guard for the container.

Having thus described my invention, what I claim as new is:

In combination a container and lid assembly comprising a thin walled, bowl shaped container made of flexible plastic material, a circular skirt depending from the upper marginal edge of the container, a two-part container lid having a thin walled, annular first part made of flexible plastic material, a downturned circular flange formed on the outer edge of the first part and normally adapted to closely embrace the skirt on the container, a snap-on connection between the lower edges of the skirt and the rim, an upstanding circular neck formed on the central portion of the first part and having an outwardly facing, continuous groove formed in its exterior surface, a disc shaped second part having a downturned marginal flange normally adapted to embrace the neck, said flange having a continuous bead around the inner lower edge normally having a snap-on engagement with the groove in the neck, said first part having an annular dished portion surrounding the neck, the position second part being flush with the plane of the first part, and the container having an annular rib on the bottom thereof provided with an inside diameter concentric with and slightly larger than that of the outside diameter of the second part.

References Cited by the Examiner

UNITED STATES PATENTS

| | | | |
|---|---|---|---|
| 2,298,814 | 10/1942 | Weis. | |
| 2,764,199 | 9/1956 | Tupper | 150—0.5 |
| 2,833,324 | 5/1958 | Burroughs | 150—.5 |
| 3,117,692 | 1/1964 | Carpenter et al. | 220—60 |
| 3,139,131 | 6/1964 | Hutchinson | 150—0.5 |

FRANKLIN T. GARRETT, *Primary Examiner.*

JOSEPH R. LECLAIR, *Examiner.*

M. L. MINK, *Assistant Examiner.*